(12) United States Patent
Baumann

(10) Patent No.: US 7,730,161 B2
(45) Date of Patent: Jun. 1, 2010

(54) INFORMATION EXCHANGE SYSTEM AND METHOD

(75) Inventor: Martin Baumann, Burlington, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 628 days.

(21) Appl. No.: 11/690,927

(22) Filed: Mar. 26, 2007

(65) Prior Publication Data

US 2008/0240012 A1    Oct. 2, 2008

(51) Int. Cl.
*G06F 15/16* (2006.01)
(52) U.S. Cl. .................. 709/217; 709/245; 709/223; 709/238; 709/220; 709/204; 709/206; 709/224; 709/205; 709/246; 709/226; 370/338; 370/313; 370/445; 370/329; 370/328; 715/269
(58) Field of Classification Search .................. 709/217, 709/246, 245, 223, 220, 224, 226; 370/313, 370/338, 445, 329, 328; 700/90; 715/531, 715/269, 526
See application file for complete search history.

(56) References Cited

U.S. PATENT DOCUMENTS

| 6,587,835 | B1 | 7/2003 | Treyz et al. |
| 7,187,997 | B2 | 3/2007 | Johnson |
| 2008/0147406 | A1* | 6/2008 | Da Palma et al. ............ 704/260 |
| 2008/0154398 | A1* | 6/2008 | Moorer et al. ................. 700/90 |

FOREIGN PATENT DOCUMENTS

WO         0154104 A1    7/2001

* cited by examiner

*Primary Examiner*—Jude J Jean Gilles
(74) *Attorney, Agent, or Firm*—Husky Intellectual Property Services

(57) ABSTRACT

A system and method for providing on demand information exchange between a data store and a portable recipient data storage device includes a source of data and a data transfer initiator, coupled to the source of data and configured for initiating the transfer of data from the source of data to a portable recipient data storage device. A data transfer port is provided to couple the data source with the portable recipient data storage device, and configured for transmitting, on request by the recipient, data from the source of data to the portable recipient data storage device.

12 Claims, 1 Drawing Sheet

INFORMATION EXCHANGE SYSTEM AND METHOD

TECHNICAL FIELD OF THE INVENTION

The present invention relates to information exchange and more particularly, relates to a system and method of exchanging information between a data source and a desired recipient's portable data storage device.

BACKGROUND INFORMATION

There are many instances in which it is desired to provide a potential recipient with various data. For exemplary purposes only, at a trade show for example, vendors often print significant amounts of advertising material, technical information and other data relative to the products or services they are selling. Generally speaking, this information is specific to a particular product, a particular display, trade show location or trade show being attended. Once the trade show is over, the information is sometimes outdated and not used again. Printing such information is very expensive and time-consuming. Further, a vendor typically does not have the ability to print all of the information they would like to give to a potential customer or consumer/information seeker and must restrict the information they provide based on time, space or budgetary constraints.

When a vendor does print material, there is often a significant amount of material that must be given out to a potential customer. Oftentimes customers have large bags full of material they receive from multiple vendors. This information is bulky and often difficult to transport back to the recipient's home, office or hotel room to be viewed at the recipient's convenience.

Some vendors have tried to circumvent this problem by providing information in a portable electronic means such as a CD-ROM or videocassette. Although this may be an improvement over providing printed information, there are still many restrictions with this form of data dissemination in that there is a significant time and cost involved in preparing certain information and transferring it to the media. Further, the media has an associated cost that is not always insignificant. In addition, once the event has transpired, the previously prepared media often cannot be used again and is therefore wasted.

Accordingly, there is a long felt need for a system and method which can easily, quickly and at very low cost provide data and other information to a recipient utilizing stored data which is transferred to a portable receiving device which is carried by the recipient upon request by the recipient.

SUMMARY OF THE INVENTION

The present invention features a system and method for providing on demand data exchange between a data store and a portable recipient data storage device. The system includes a source of data and a data transfer initiator. The data transfer initiator is coupled to the source of data and is activated by a recipient and serves for initiating the transfer of data between the data source and the portable recipient data storage device. A data transfer port is provided. The data transfer port is coupled to the source of data and responsive to the dated transfer initiator that initiates a transfer of data. The data transfer of port is configured for transmitting the data from the source to the portable recipient data storage device.

In the preferred embodiment, the data stored by the source of data may include one or more of textual data, video data and audio data, although any other type of data is contemplated by the present invention. The data initiator may be a button coupled to the data source or alternatively, some device or signal which emanates from the portable recipient data storage device. The data transfer port may include a USB port and/or a wireless data port. Examples of portable recipient data storage devices include USB port devices such as a memory stick or the similar device as well as an Ipod or other similar MP3 storage and player device as well as Blackberries, cell phones, PDAs, etc.

The source of data may be located on a product or service display device such as a trade show display or other publicly available display devices as may be located in airports, hotels, lobbies, subways, buses or other public places. The source of data may include a computer or of the storage device that has the capability of storing data and, on demand, transferring some or all of the data stored to a recipient's data storage device.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the allowed claims and their legal equivalents.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
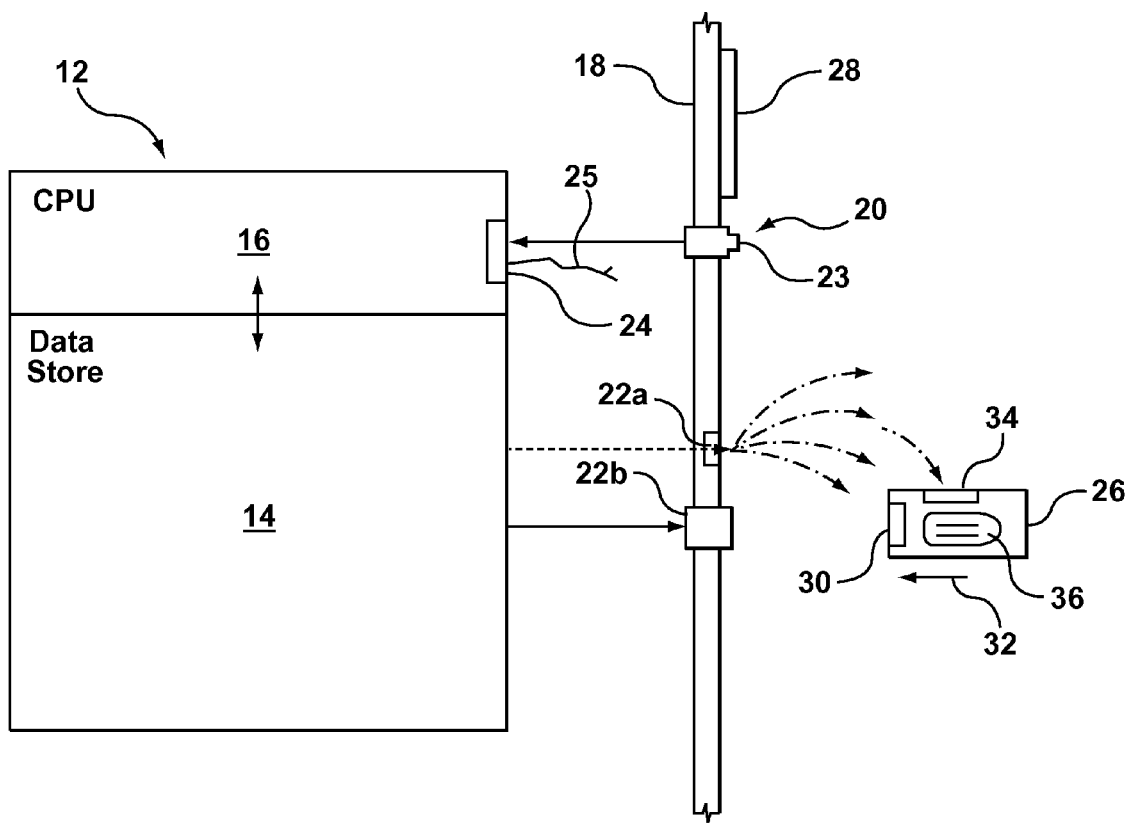
FIG. 1 is a schematic diagram illustrating an exemplary system that can be utilized to carry out the teachings of the system and method of the present invention.

An exemplary information exchange system 10, FIG. 1, is shown and described herein. The present invention includes a source of data 12 that is associated with some form of display device 18 as will be explained in greater detail below. The source of data 12 typically includes a device 14 to store actual data and a controller or CPU 16 that serves to control the dissemination of data stored in the data store 14. Examples of a data store 14 include, but are not limited to, a disk drive, CD, DVD, optical disk and volatile or nonvolatile computer memory.

The CPU 16 is responsive to a data transfer initiator 20 and corresponding initiator signal that is configured to cause the source of data 12 to provide data related specifically to the display device 18 over 10 more ports 22a, 22b. The data transfer initiator 20 may include a physical button 23 that a user may push or alternatively, CPU 16 may include a region 24 that is responsive to wireless commands 25 received from a user's data storage device 26 as will be explained in greater detail below. The purpose of the data transfer initiator 20 is to cause the source of data 12 to provide data specifically related to the display 18. The source of data 12 may include a significant amount of data some of which may or may not be related to the specific display device 18 with which the data store is associated. In this manner, a universal data store 12 may be provided while a user may request down lowed of only information related specifically to the display device 18 of interest to the user.

The display device 18 may, for example, include information region 28 related to a specific product or service. The display device 18 may be in the form of a trade show display or a dynamic or static display in a public place such as an airport, hotel lobby, subway station, train, bus or the like. If a user is interested in obtaining additional or more detailed information about the product or service displayed in information region 28, a user will take his or her personal, portable data storage device 26 and initiate and download all or some of the information from the source of data 12 for review later on by the recipient at his or her leisure.

Examples, without limitation, of portable data storage devices 26 include flash drives, memory sticks, MP3 players, IPODs, cell phones, Blackberrys, and PDAs. Some of these devices will include a USB port or other similar hardwired port 30 in which case the display device 18 will include a corresponding port 20*b* into which the user may insert his or her portable data storage device 26 either directly, as shown by arrow 32, or using a wire or cable, while other such portable data storage devices 26 will include a wireless port 34 which will interact with a wireless port 22*a* on the display device 18.

In the case where the user has a portable data storage device 26 having a hardwired port 30, the user will connect his or her portable data storage device 26 with port 22*b* on the display device and initiate data transfer such as by depressing button or similar user activated device 23. The system may allow the user to transfer all or only some of the data in which case the data to be transferred may be user selectable using the user activated device 23. Data will then be transferred from the data store 14 to the user's portable data storage device 26. In the case where the user has a portable data storage device having a wireless port 34, the user will be instructed to press some key or button on the user's portable data storage device 26 or otherwise cause the initiation of data transfer wirelessly between wireless port 20*a* and a corresponding wireless port 34 on the user's portable data storage device 26.

Examples of data which may be transferred to include information previously provided and printed form such as advertising information, technical specifications, promotional material and audio and video data related to the product or service being promoted, displayed or advertised on the display device 18. In certain situations such as trade shows and the like, the vendor advertising its product or service may even provide the user with the portable data storage device 26 as a promotional device. For example, a vendor may provide someone visiting their trade show booth with an MP3 player, IPOD or other data storage device 26 as a gesture of goodwill and for promotional purposes. In such instances, the data storage device 26 may also include a logo or insignia 36 of the vendor. In this way, the user can utilize the data storage device 26 not only for storing the vendor's information but for other purposes as well, all the while building goodwill for the vendor because of the advertising 36.

Accordingly, the present invention provides a novel system and method by which to transfer product or service specific information to a user using a computerized data store from which the user can download product or service specific audio, video or textual information onto a user's portable electronic data storage device.

The present invention is not intended to be limited to a system or method which must satisfy one or more of any stated or implied objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the allowed claims and their legal equivalents.

The invention claimed is:

1. A system for providing on-demand data exchange between a data store and a portable data-storage device of a user, the system comprising:
   a source of data, including:
      a device for storing data associated with the specific product or service,
      a controller serving to control dissemination of the data associated with the specific product or service,
      a display device including an information region being configured to display the data associated with a specific product or service,
   a data-transfer initiator being coupled to the source of data, the data-transfer initiator being activatable by the user, the data-transfer initiator for initiating the data transfer between the source of data and the portable data-storage device, the data-transfer initiator being configured to cause the source of data to provide the data to the display device, and
   a data-transfer port coupled to the source of data, and responsive to the dated transfer initiator that initiates transfer of the data associated with the specific product or service, the data-transfer port is configured for transmitting the data from the source of data to the portable data-storage device,
   wherein the data-transfer initiator is responsive to the user interested in obtaining additional or more detailed information about the specific product or service displayed in the information region, the data-transfer initiator initiates and downloads all or some of the information from the source of data for review later on by the user.

2. The system of claim 1, wherein said source of data includes at least one type of information selected from the group consisting of textual data, video data and audio data.

3. The system of claim 1, wherein said data transfer initiator includes a user activated device.

4. The system of claim 1, wherein said data transfer initiator includes a signal received from a portable recipient data storage device.

5. The system of claim 1, wherein said portable recipient data storage device includes a USB port mating device.

6. The system of claim 5, wherein said USB port mating device includes a portable data storage device.

7. The system of claim 5, wherein said USB port mating device includes a portable recipient data storage device configured for storing at least one of audio data, video data and textual data.

8. The system of claim 1, wherein said portable recipient data storage device includes a wireless portable data storage device.

9. The system of claim 8, wherein said wireless portable data storage devices selected from the group consisting of a cell phone and a PDA.

10. The system of claim 1, wherein said product or service display device includes a trade show display device.

11. The system of claim 1, wherein said product or service display device includes a public place display device.

12. The system of claim 11, wherein said public place display device is selected from the group consisting of a trade show display device, an airport display device, a hotel display device, a subway display device and a bus display device.

\* \* \* \* \*